J. A. TERRIO.
EGG HANDLING DEVICE.
APPLICATION FILED DEC. 10, 1915.

1,203,938.

Patented Nov. 7, 1916.

UNITED STATES PATENT OFFICE.

JOSEPH ANDREW TERRIO, OF OGDENSBURG, WISCONSIN.

EGG-HANDLING DEVICE.

1,203,938. Specification of Letters Patent. Patented Nov. 7, 1916.

Application filed December 10, 1915. Serial No. 66,153.

*To all whom it may concern:*

Be it known that I, JOSEPH ANDREW TERRIO, a citizen of the United States, residing at the city of Ogdensburg, county of Waupaca, and State of Wisconsin, have invented new and useful Improvements in Egg-Handling Devices, of which the following is a specification.

My invention relates to improvements in devices for handling eggs, whereby a large number of eggs may be simultaneously examined and tested, and thereafter simultaneously conveyed to a suitable receptacle and dumped or discharged without liability of being broken.

My invention is further explained by reference to the accompanying drawings, in which—

Figure 1:
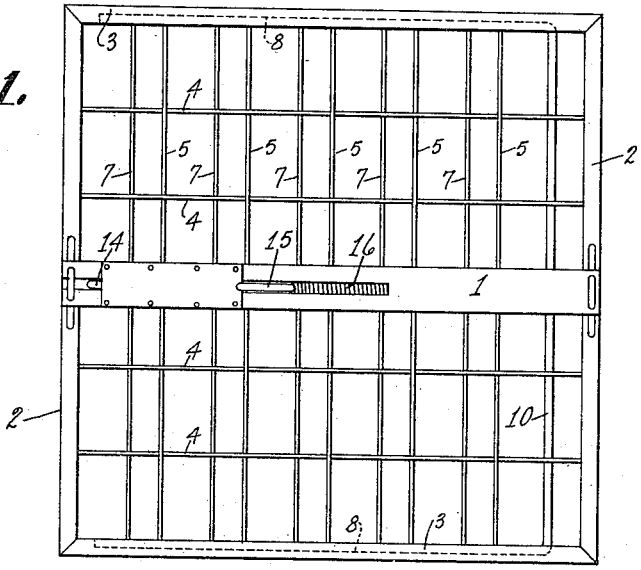
Figure 2:
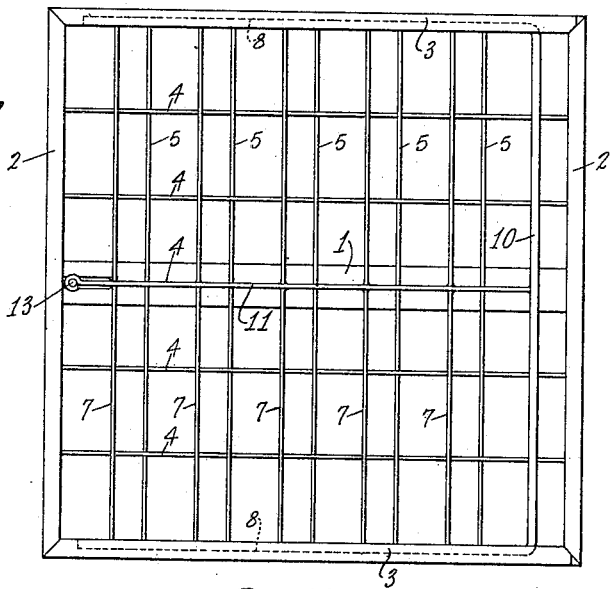
Figure 3:
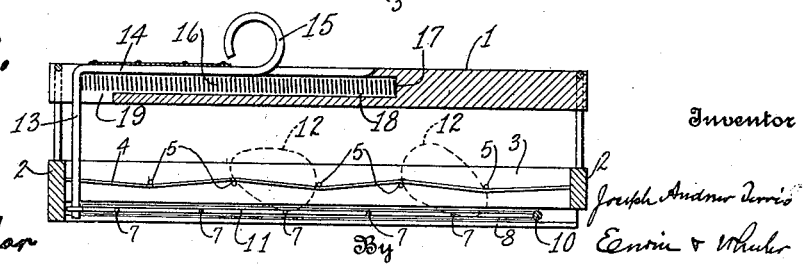

Figure 1 represents a plan view thereof. Fig. 2 is a bottom view, and Fig. 3 is a vertical section.

Like parts are identified by the same reference numerals throughout the several views.

My device comprises a rectangular frame, the central member 1 and sides and ends 2 and 3 of which are preferably formed of wood. Centrally supported between the upper and lower sides of the receptacle is a screen comprising wires 4 and 5, which are arranged at right angles to each other, as shown in Figs. 1 and 2. At the lower side of the receptacle is an additional series of wires 7, as shown in said Figs. 1 and 2. The wires 7 are supported at their respective ends from the slidable members 8, 8, which are retained in place in any convenient manner. Connected with said members 8, 8 is a transverse member 10 and central member 11, whereby as said member 11 is drawn toward the right, reference being had to Fig. 2, said series of wires 7 are brought directly beneath said series of wires 5, whereby the eggs indicated by dotted lines 12 are free to drop from the receptacle into an egg receptacle provided therefor. Connected with the rod 11 is a vertical rod 13, a horizontal rod 14, and a handle 15 by which motion is communicated from the hand of the operator to said wires 7 when desirous to discharge the eggs from the inclosing receptacle.

16 is a spiral spring which is interposed between the bearing 17 and the vertical member 13, and said spiral spring is adapted by its recoil to force said wires 7 to one side of the wires 5, whereby the eggs 12 are adapted to rest upon said lower series of wires 7, and are thereby prevented from escaping from between the wires 5. The handle 15 is supported upon the upper surface of the central member 1 and said central member is provided with a recess 18 for the reception of one end of said spiral spring 16, and said central member is also provided with a wider recess 19 which limits the movement of said handle and the parts connected therewith so that the several wires can only be drawn toward the right far enough to be brought directly beneath the wires 5.

Having thus described my invention what I claim as new and desire to secure by Letters Patent, is;—

1. In an egg handling device of the described class, the combination of a rectangular frame, two sets of wires located at slight distances apart between such frame, each set comprising two series of wires, each series located at right angles to the other forming angular spaces for the reception of the eggs, means for normally retaining one set of wires out of vertical alinement with the other set, whereby the lower set of wires is adapted to support eggs in each of the angular spaces in the upper set, and means for manually bringing the wires of one set into vertical alinement with the other set, whereby eggs supported by said wires are free to be discharged therefrom.

2. In an egg handling device of the described class, the combination of a rectangular frame, two sets of wires located at slight distances apart between such frame, each set of wires comprising two series of wires, each series located at right angles to the other forming angular spaces between them for the reception of eggs, a spring, and a frame, for normally retaining one set of wires out of vertical alinement with the other set, whereby the lower set of wires is adapted to support eggs in each of the angular spaces of the upper set, and means for manually bringing the wires of one set into vertical alinement with the other set, whereby eggs supported by said wires may be discharged therefrom.

3. In an egg handling device of the described class, the combination of a rectangular frame, two sets of wires located at slight distances apart between such frame, each set of wires comprising two series of wires, each series located at right angles to the other forming angular spaces between them for the reception of eggs, a spring, and a frame for normally retaining one set of wires out of vertical alinement with the other set, whereby the lower set of wires is adapted to support eggs in each of the angular spaces of the upper set, a handle and a metallic frame for manually bringing the wires of one set into vertical alinement with the other set, whereby eggs supported by said wires may be readily discharged therefrom.

In testimony whereof I affix my signature in the presence of two witnesses.

JOSEPH ANDREW TERRIO.

Witnesses:
  LOUIS LARSON,
  AUGUST STEFFENHAGEN.

Copies of this patent may be obtained for five cents each, by addressing the "Commissioner of Patents, Washington, D. C."